United States Patent Office 2,787,334
Patented Apr. 2, 1957

2,787,334

ELECTROSTATIC DUST SEPARATORS

Erik Torvald Linderoth, Stockholm, Sweden

Application June 22, 1955, Serial No. 517,187

Claims priority, application Sweden November 7, 1953

6 Claims. (Cl. 183—7)

The present invention relates to an electrostatic dust separator having a gas distributing grate adjacent the gas inlet end, said gas distributing grate forming a preliminary separator. The gas distributing grate comprises spaced inclined ribs disposed, in a plane, the sides of these ribs turned toward the gas inlet side forming an acute angle to the direction of gas flow.

The present invention consists primarily therein that in front of the gas distributing grate at its inlet side there is provided a guide-plate which is positioned so that it forms an acute angle with the gas distributing grate. The guide-plate extends from the gas inlet towards the hopper for collecting the separated solid particles, but does not extend all the way to the hopper.

At the end of the guide-plate which is directed towards the hopper there is provided a space which is so large that the gas current after passing the guide-plate end can form a free jet with recirculation of the gas. This space continues in a dust collecting hopper lying there below.

Further characteristic features of the invention and details of the advantages obtained thereby will be apparent from the following description of an embodiment form of the invention illustrated somewhat diagrammatically in the appended drawings; in which.

Figure 1:
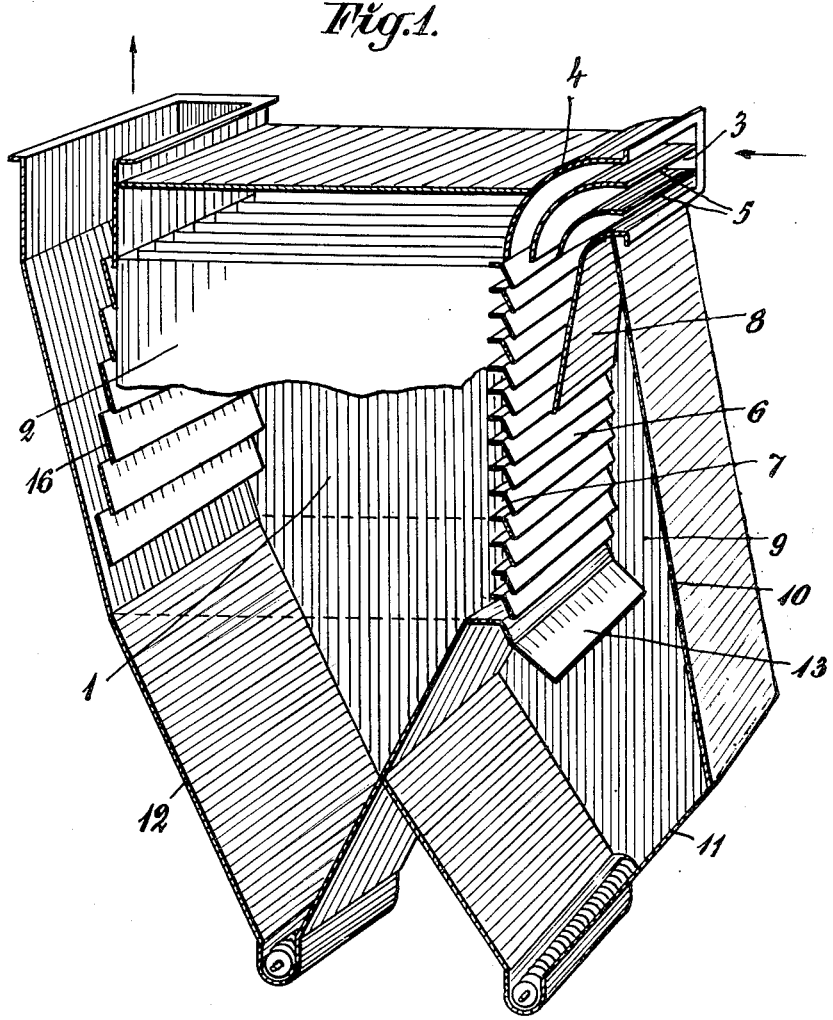
Fig. 1 shows an electrostatic dust separator with horizontal gas flow in perspective view, partly in section.
Figure 2:
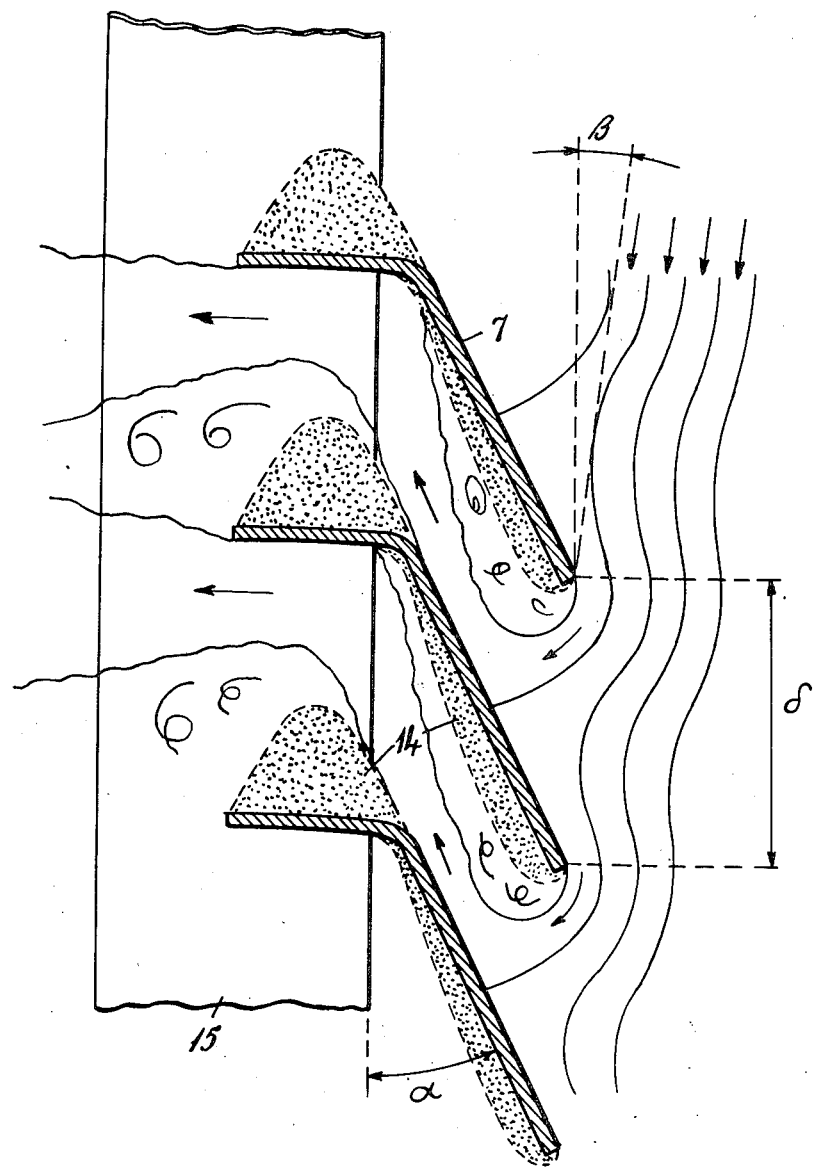
Fig. 2 illustrates at an enlarged scale a detail of Fig. 1.

In Figs. 1 and 2, the numeral 1 designates a chamber in which flat collector electrodes 2 are arranged vertically, between which wire-shaped emission electrodes (not shown) are suspended in a manner known per se. The gas to be purified is supplied through a rectangular inlet 3, which is connected to a horizontal gas supply duct. The gas entering through the gas inlet 3 is deflected downwardly in a curved passage 4, in which curved guide-plates 5 are provided to avoid turbulence. The gas current deflected downwardly passes along a gas distributing grate 6, which consists of a number of flat ribs 7 constructed in a manner similar to a curtain and extending across the inlet side of the dust separator the sides of said ribs turned towards the gas inlet side forming acute angles to the direction of gas flow. Said rib sides deflect all coarser particles, so that they are returned to the gas current which is guided by a guide plate 8. The guide plate 8 which forms an acute angle to the grate 6, extends only along the top portion of the grate 6, so that therebelow a space 9 is formed between the lower portion of the grate 6 and a partition 10, said space being so large that after passing the guide-plate 8 the gas current can form a free jet with recirculation of the gas having passed. Said gas circulation is of a great importance for the dust separating capacity of the grate 6.

The space 9 has the further advantage that the coarser particles carried by the gas cannot impinge anew on the ribs 7 and pass through the grate 6, which would be the case if the guide plate 8 extended unto the lower end of the grate 6. Thus, the dust separator receives a good selectivity as a dust separator so that only particles below a certain particle size will pass through the grate 6. To this result the guide plates 5 will aid which additionally guide and direct the gas flow.

The separated particles descend into a collecting hopper 11, which is separate from the collecting hopper 12 in which the particles separated with the aid of the electrostatic dust separator proper are collected.

Having passed the guide plate 8, the gas flow is deflected by means of a baffle 13 so that no excessive whirling can occur in the hopper 11.

When purifying e. g. flue gases, it is possible, due to the selectivity of the preliminary separator, to separate the quick coke from the quick ashes. The quick coke can then be returned to the hearth and be burnt there. Thereby, a substantial fuel economy can be achieved.

At the rear side of the grate 6 facing the electrostatic separator proper the ribs 7 are bent horizontally, whereby the gas current, which is divided into thin laminar flow layers will be deflected horizontally.

Fig. 2 shows on an enlarged scale details of the ribs 7 and illustrates the conditions of flow therebetween to which the gas is subjected. the spacing $\delta$ between the ribs 7 should be selected so great that no choking from deposited dust particles can occur, since the grate 6 will then be more of a hindrance than useful. If desired, the grate 6 can be equipped with beating means, as is usual at the collector electrodes 2. If such beating means is present, the grate 6 can be constructed with a closer spacing and a correspondingly higher separating effect, so that the main portion of the particles are separated by the grate 6.

A suitable spacing $\delta$ of the ribs will then be between 6 and 12 millimeters, while without beating means the spacing must be between 50 and 100 millimeters. The angle $\alpha$ should be between 20° and 45°. The flow angle $\beta$ should not surpass 11°, since then the grate 6 would lose the major portion of its separating capacity. The angle $\beta$ which is preferably selected between 5° and 10°, will be determined apart from the guide plate 8, by the ratio of the cross-sectional area of the inlet 3 and the total area of the grate 6. The grate area should be at least five times that of the cross-sectional area of the inlet 3. The quotient of the inlet cross-sectional area and the grate area should thus be less than $\frac{1}{5}$, preferably between $\frac{1}{12}$ and $\frac{1}{6}$. The sine of the angle of inclination of the guide plate 8 to the grate 6 should correspond to the quotients referred to.

In Fig. 2, the numeral 14 refers to the dust deposits which will be formed in the absence of beating means. The numeral 15 designates the vertical iron plates which hold together the ribs 7 and should be disposed on the rear side of the grate, since otherwise the friction boundary layers at the plates form a dust leakage through the grate.

At the gas outlet side of the separator there is provided a gas distributing grate 16 (Fig. 1) which serves to distribute the discharging gas flow uniformly.

With the arrangement described here a completely horizontal and uniform gas flow in the separating chamber between the grate 6 and the grate 16 will be achieved.

Having now particularly described the nature of my invention and the manner of the operation what I claim is:

1. An electrostatic particle separator for separating solid particles of different size contained in a flow of gas, said separator comprising an outer housing having an inlet opening and an outlet opening for the gas to be purified, partition walls within said housing defining an inner chamber for separating therein fine particles, and together with wall portions of the housing including said gas inlet opening an outer chamber for separating therein coarse particles; electrostatic separating means disposed within said inner chamber, the partition wall portions facing the inlet opening being in form of a plurality of parallel louvers disposed in one general plane and each slanted relative to the perpendicular away from the inner chamber, said louvers forming a gas distributing inlet grid constituting a selective preliminary particle separator deflecting coarse particles impinging thereupon back into the flow of gas admitted through said inlet opening into the outer chamber, said inlet opening communicating with the upper portion of the outer chamber, guide means disposed within the outer chamber and extending from the inlet opening in the upper portion of the outer chamber toward the distal end of the grid but ending short thereof and forming an acute angle with the general plane of said louvers, the middle portion of the outer chamber as defined by the louvers situated beyond the end of the guide means and the respective housing wall portions forming a space for refluxing the flow of gas flowing past said distal end of the guide means, and the bottom portion of the outer chamber forming a collecting space for coarse particles separated from the gas flow in the outer chamber.

2. A particle separator according to claim 1, wherein a gas deflecting means is mounted within the outer chamber extending approximately from the lower end of said grid partly across said bottom portion of the outer chamber, said deflecting means reversing the direction of the flow of gas for refluxing the same and impeding the ingress of the flow of gas into the bottom portion to prevent an agitation of coarse particles collected therein.

3. A particle separator according to claim 2, wherein each of said louvers includes a portion extending toward said inner chamber for directing the flow of gas passing between the louvers into the said chamber in a predetermined direction upon said electrostatic separating means.

4. A particle separator according to claim 3, wherein each of said louvers comprises a portion slanted to the perpendicular and facing the outer chamber and a portion at a right angle to the perpendicular and extending toward the inner chamber.

5. A particle separator according to claim 1, wherein said partition walls and the wall portion of the housing including said outlet opening constitute a second outer chamber, the respective portion of said partition walls being formed by louvers constituting a gas distributing outlet grid.

6. A particle separator according to claim 5, wherein said outlet grid occupies at least the major portion of the gas outlet area of said electrostatic separating means.

References Cited in the file of this patent

UNITED STATES PATENTS

| | | |
|---|---|---|
| 2,448,424 | Dohrmann | Aug. 31, 1948 |
| 2,713,920 | Phyl | July 26, 1955 |

FOREIGN PATENTS

| | | |
|---|---|---|
| 418,551 | Great Britain | Oct. 22, 1934 |
| 520,710 | Germany | Mar. 13, 1931 |
| 562,890 | Germany | Oct. 29, 1932 |